United States Patent
Bretscher et al.

(10) Patent No.: US 9,451,290 B2
(45) Date of Patent: Sep. 20, 2016

(54) MULTI-SPECTRAL IMAGE COMPRESSION

(71) Applicant: Google Technology Holdings LLC, Mountain View, CA (US)

(72) Inventors: John T. Bretscher, Elgin, IL (US); Randall S. Vaas, Wyoming, MI (US)

(73) Assignee: Google Technology Holdings LLC, Mountain View, CA (US)

( * ) Notice: Subject to any disclaimer, the term of this patent is extended or adjusted under 35 U.S.C. 154(b) by 42 days.

(21) Appl. No.: 14/279,442

(22) Filed: May 16, 2014

(65) Prior Publication Data

US 2015/0189304 A1    Jul. 2, 2015

Related U.S. Application Data

(60) Provisional application No. 61/920,798, filed on Dec. 26, 2013.

(51) Int. Cl.
| | |
|---|---|
| *H04N 19/17* | (2014.01) |
| *H04N 19/90* | (2014.01) |
| *H04N 19/50* | (2014.01) |

(52) U.S. Cl.
CPC ............. *H04N 19/90* (2014.11); *H04N 19/50* (2014.11); *H04N 19/17* (2014.11)

(58) Field of Classification Search
None
See application file for complete search history.

(56) References Cited

U.S. PATENT DOCUMENTS

| | | | | |
|---|---|---|---|---|
| 5,513,128 | A * | 4/1996 | Rao | H04N 19/593 348/384.1 |
| 2009/0018801 | A1* | 1/2009 | Gladkova | H03M 7/3082 703/2 |
| 2011/0007819 | A1* | 1/2011 | Chen | H04N 19/63 375/240.19 |
| 2011/0249894 | A1* | 10/2011 | Meany | H03M 7/30 382/166 |
| 2012/0140829 | A1* | 6/2012 | Rane | H04N 19/50 375/240.18 |
| 2013/0320195 | A1* | 12/2013 | Wang | H01L 27/14627 250/208.1 |
| 2014/0049662 | A1 | 2/2014 | Lin et al. | |
| 2015/0189304 | A1* | 7/2015 | Bretscher | H04N 19/17 382/238 |
| 2015/0215618 | A1* | 7/2015 | Bretscher | H04N 19/503 348/262 |

FOREIGN PATENT DOCUMENTS

WO    2009151903 A2    12/2009

OTHER PUBLICATIONS

Penrose et al "Extending Lossless Image Compression" Eurographics UK Apr. 13-15, 1999.*

* cited by examiner

*Primary Examiner* — Sean Motsinger
(74) *Attorney, Agent, or Firm* — Brake Hughes Bellermann LLP

(57) ABSTRACT

This document describes techniques and apparatuses for implementing multi-spectral compression. These techniques enable a computing device to capture a set of images at different spectral sensitivities using a multi-spectral array imager. Once the set of images are captured by the multi-spectral array imager, the set may be encoded using encoding techniques that involve spectral prediction in addition to spatial and temporal prediction.

10 Claims, 6 Drawing Sheets

MULTI-SPECTRAL IMAGE COMPRESSION

BACKGROUND

This background description is provided for the purpose of generally presenting the context of the disclosure. Unless otherwise indicated herein, material described in this section is neither expressly nor impliedly admitted to be prior art to the present disclosure or the appended claims.

The amount of information in a digital image can be enormous. For a set of images, that amount increases proportionally with the number of images in the set. Consequently, both storing and transmitting a set of images can place a substantial burden on computing resources. To address this, techniques have been developed to "compress" image information. Compression involves encoding the image information in such a way that the resulting information burdens resources less (e.g., takes up less storage space) than if the image information is not compressed. These techniques generally rely on redundancy or predictability in the image information. For example, an image of a million pixels, all of which are pure white, could be stored using a million data points, each of which represents one pixel at a particular location in the image and having the color white. The image could be represented with far fewer data points, however. Specifically, the image could be represented using data points that specify the boundary of a region and that the region within the boundary is white. This is a simple example of "spatial" encoding.

In "spatial" encoding, the color of a small region can be predicted from the values of nearby regions. The predicted value is compared against the actual value. When encoded, the small region is represented by a delta between the predicted value and its actual value. The process is reversed for decoding such that the region value is predicted from nearby "known" (e.g., already decoded) regions, and the delta is applied to result in the actual value of the region. In most cases, spatial encoding results in a tremendous amount of image compression, e.g., a tremendous savings in the resources used to represent an image.

Images in a temporal sequence can be compressed using "temporal" prediction. When an image in a sequence of images (e.g., frames of video content) is encoded using temporal prediction, previous and subsequent images in the sequence can be used to predict data points for the image under consideration. Like spatial prediction, just the difference between the predicted image and the actual image may be encoded with temporal prediction. Performing spatial and temporal prediction, and storing or transmitting the resulting information, however, can still burden computing resources.

BRIEF DESCRIPTION OF THE DRAWINGS

Techniques and apparatuses enabling multi-spectral image compression are described with reference to the following drawings. The same numbers are used throughout to reference like features and components.

DETAILED DESCRIPTION

Conventional techniques for compressing image data into a format that uses fewer computing resources than an original format often do so using some combination of spatial and temporal prediction. These techniques are limited, however, by the information considered when performing the compression, such as spatial and temporal information to perform spatial and temporal prediction. Consequently, these techniques and the resulting information may place a substantial burden on computing resources.

This disclosure describes techniques and apparatuses that facilitate multi-spectral image compression, which enables image data to be compressed using images that are captured of a same scene and at a same time but with different spectral sensitivities. To capture multiple images of a scene at substantially a same time but with different spectral sensitivities, an "array imager" may be used. Rather than capturing just one image at a time, an array imager takes a set of images simultaneously. Array imagers include multiple imagers that are generally located very close together in the array. As a result, a set of images captured using an array imager exhibits little "parallax"—a displacement or difference in apparent position of an object viewed along two different lines of sight that is measured by the angle or semi-angle of inclination between those two lines of sight—between the images. In addition, the imagers in the array can each have a unique filter or be configured for a unique spectral sensitivity. By configuring the imagers of an array with unique filters or for unique spectral sensitivities, an array imager may capture a set of images of a same scene, at a same time, and with different spectral sensitivities.

The multi-spectral image compression techniques described herein can encode a set of images based on the images being captured of a same scene, at substantially a same time, and with different spectral sensitivities. For example, one image can be predicted based on the other images by accounting for the different spectral sensitivities with which the images are captured. Given this prediction and a delta between the prediction and the actual image information, delta encoding can be used to encode the set of images.

In some implementations, the different filters or different spectral sensitivities with which a set of images are captured results in images of differing resolutions. An infrared image has a lower resolution (because infrared has a longer wavelength of light or due to a smaller amount of light in those wavelengths) than a visible-light image, for example. Such differences can be used to order the images in a set from highest to lowest resolution. In this way, a given image may be encoded from images of higher resolutions.

The following discussion first describes an operating environment, followed by techniques that may be employed in this environment, and ends with an example apparatus.

Operating Environment

Figure 1:
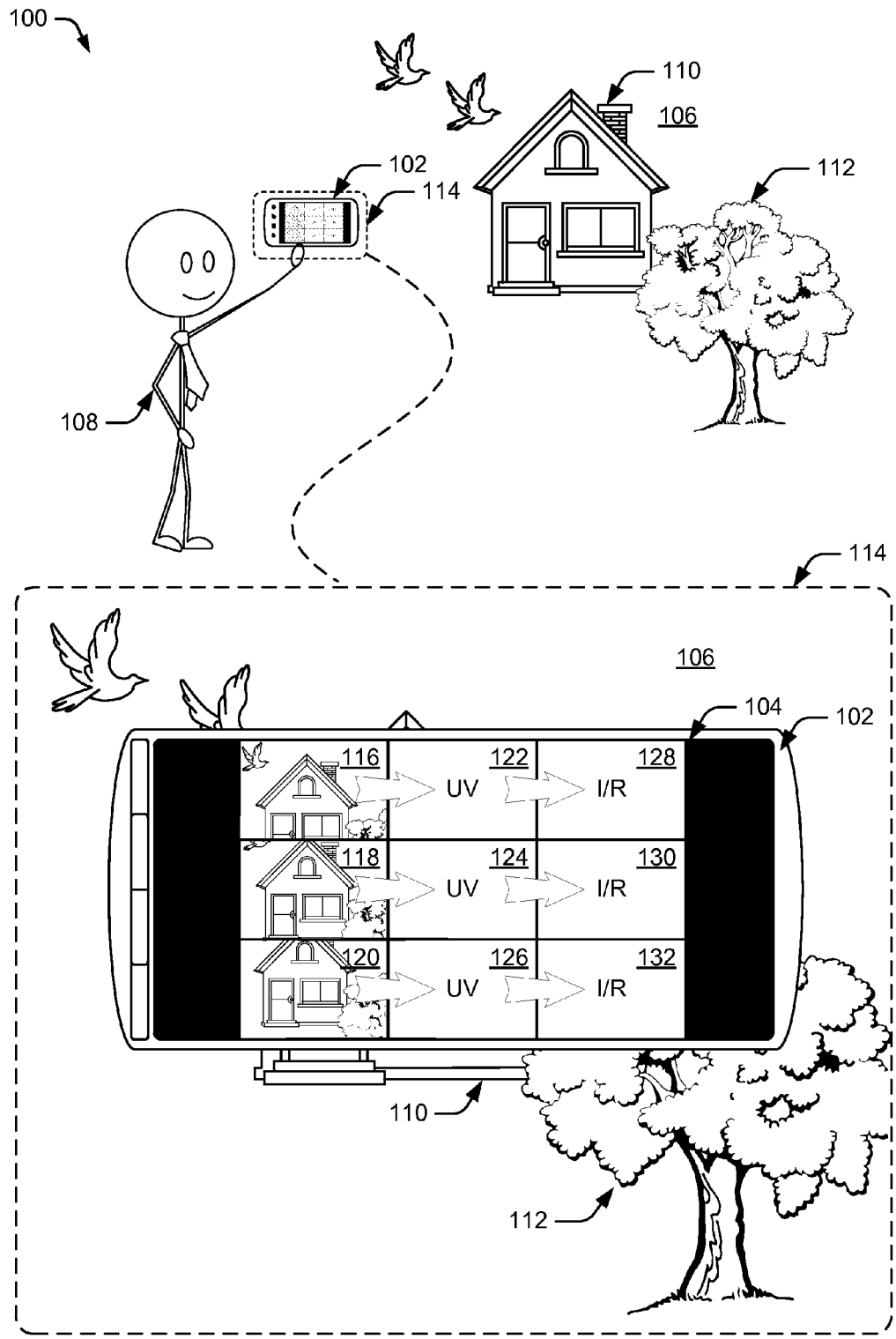
FIG. 1 illustrates an example environment in which techniques of multi-spectral image compression can be implemented.

FIG. 1 illustrates an example environment 100 in which techniques described herein can be implemented. Environment 100 includes a computing device 102 having display 104 through which portions of a scene 106 can be presented to a user. Portions of scene 106 can be captured by an array imager (not shown) of computing device 102, which may be located on a surface of computing device 102 that is opposite to a surface on which display 104 is located. The array imager of computing device 102 is capable of sensing both light that is perceivable by the human eye (e.g., visible light) as well as radiation that is not perceivable by the human eye, such as infrared, ultraviolet, x-ray, low-lux light, and so on.

Display 104 may present a user interface for configuring the array imager of computing device 102 and selecting which portions or sub-portions of scene 106 are to be captured using the array imager (e.g., through a viewfinder interface). Which portions of scene 106 are to be captured by the array imager depend, in part, on how a user orients computing device 102 with respect to environment 100. An example of one such orientation is shown in FIG. 1, in which user 108 is shown in the context of the scene 106.

By orienting computing device 102 (and the array imager thereof) toward house 110 and tree 112, user 108 is able to view at least a portion of house 110 and tree 112 through display 104 of computing device 102. For visual clarity, a detailed view of scene 106 from a perspective of user 108 is shown at user view 114. As shown by user view 114, display 104 may include different views 116, 118, 120, 122, 124, 126, 128, 130, 132 of scene 106. Each of the different views 116, 118, 120, 122, 124, 126, 128, 130, 132 of scene 106 may correspond to a different imager in the array imager. Further, each of the different views 116, 118, 120, 122, 124, 126, 128, 130, 132 of the scene 106 may be indicative of a spectral sensitivity with which the corresponding imager in the array is configured to capture an image.

Views 116, 118, 120, for instance, may correspond to imagers in the array imager that are sensitive to visible light. Accordingly, views 116, 118, 120 may be indicative of how scene 106 is to be captured by the imagers that are sensitive to visible light. As visible light is perceivable by the human eye, the views corresponding to visible-light-sensitive imagers may simply be a reproduction of the light sensed by those imagers. Other forms of radiation may not be perceivable to the human eye, however. For radiation other than visible light, the views may comprise visible-light interpretations that are derived from radiation sensed by a corresponding imager. Views 122, 124, 126, for instance, may correspond to imagers in the array that are sensitive to ultraviolet light. Since ultraviolet light is not perceivable by the human eye, views 122, 124, 126 may present visible-light interpretations of the ultraviolet light sensed by the corresponding imagers. Further, views 128, 130, 132 may correspond to imagers in the array that are sensitive to infrared. Accordingly, views 128, 130, 132 may present visible-light interpretations of the infrared sensed by the corresponding imagers.

Although views 116, 118, 120, 122, 124, 126, 128, 130, 132 correspond to imagers that are described as being sensitive to visible light, ultraviolet light, and infrared, the imagers may be sensitive to different forms of radiation without departing from the scope of the techniques described herein. For example, an array may not include imagers that are sensitive to each of visible light, ultraviolet light, and infrared. Alternately or in addition, it is to be contemplated that an array may include imagers that are sensitive to other types of radiation, such as x-ray, low-lux light, and so on.

It is also to be recognized that the display 104 of computing device 102 may present to the user only a single view, such as a view 118, which may be the result of processing in the computing device 102 data from multiple imagers in the array to produce a desired effect selected by the user. Even though the single view is displayed, the captured data from each of the respective imagers producing the respective views 116, 118, 120, 122, 124, 126, 128, 130, 132 of scene 106 may be transmitted to another device for post processing independent of any processing in computing device 102. The efficiency of communication and storage of the data from each of the respective imagers can be increased by the compression at the capturing device and decompression at the remote post-processing device described herein.

In addition, each of the different views 116, 118, 120, 122, 124, 126, 128, 130, 132 displays a slightly different image of scene 106 due to the difference in location on the array of the corresponding imager. Although imagers in an array imager are located closely together, each imager nevertheless captures a slightly different image of a scene due to this difference in location on the imager. This can be seen in views 116, 118, 120, which correspond to the imagers that are sensitive to visible light in the array.

By way of example, the imagers that correspond to views 116, 118, 120 may be located in a same column of the array. As a result, views 116, 118, 120 exhibit no left-right shift. Rather, the images presented by views 116, 118, 120 appear to lie along a same vertically-oriented plane. The imagers that correspond to views 116, 118, 120 may be located in different rows of the array imager, however. For example, the array may be arranged in a three by three (3×3) grid such that view 116 may correspond to an imager located in a first column and first row of the grid, view 118 may correspond to an imager located in the first column and second row of the grid, and view 120 may correspond to an imager located in the first column and third row of the grid. Due to the difference in vertical location in the array, images captured by these imagers may exhibit a vertical shift, one image to another. In the illustrated example, views 116, 118, 120 are each shown presenting a vertically different representation of scene 106.

In a similar fashion, images captured by imagers in a same row, but in different columns may exhibit a horizontal shift one image to another. Thus, images presented by views that correspond to imagers in a same row may appear to lie along a same horizontally-oriented plane. In any case, each imager captures scene 106 from a slightly different line of sight than the other imagers due to the location in the array. Although views 116, 118, 120, 122, 124, 126, 128, 130, 132 are discussed as corresponding to an array imager having imagers arranged in a 3×3 grid, the array imager may be configured in a variety of other ways without departing from the scope of the techniques described herein. For example, the array imager may have more or fewer than nine imagers, the imagers may be arranged in arrangements other than a grid, e.g., arranged in a single column, a single row, a circle, an off-set pattern, and so on without departing from the scope of the techniques described herein.

Figure 2:
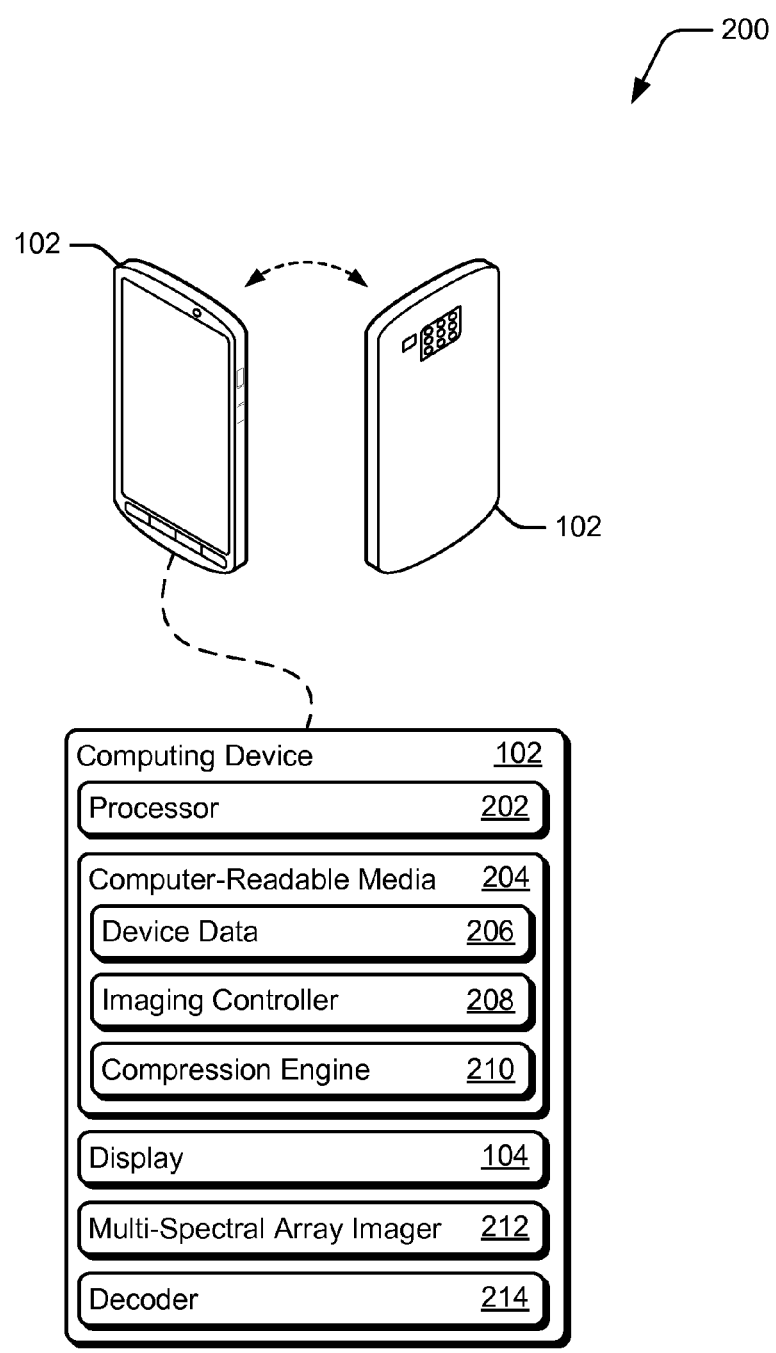
FIG. 2 illustrates an example computing device capable of implementing multi-spectral image compression.

More specifically, consider FIG. 2, which illustrates at 200 an example embodiment of computing device 102 of FIG. 1. Computing device 102 can be, or include, many different types of computing or electronic devices capable of implementing multi-spectral image compression. In this example, computing device 102 is shown as a smart phone, though other devices are contemplated. Other computing devices 102 may include, by way of example, a cellular phone, notebook computer (e.g., netbook or ultrabook), camera (compact or single-lens reflex) smart-watch, smart-glasses, tablet computer, personal media player, personal navigating device (e.g., global positioning system), gaming console, desktop computer, video camera, or portable gaming device.

Computing device 102 includes processor 202, which may be configured as a single or multi-core processor capable of enabling various functionalities of computing device 102. In some cases, processor 202 includes a digital-signal processing subsystem for processing various signals or data of computing device 102. Processor 202 may be coupled with, and may implement functionalities of, any other components or modules of computing device 102 that are described herein.

Computing device 102 includes computer readable-media 204. Computer-readable media 204 (CRM 204) includes device data 206, such as an operating system, firmware, or applications of computing device 102 that are executable by processor 202. Alternately or additionally, device data 206 may include various user data, such as images (e.g., those captured by a multi-spectral array imager and those encoded using multi-spectral image compression), music, documents, emails, contacts, and the like. CRM 204 also includes imaging controller 208 and compression engine 210, which in this example are embodied as computer-executable code stored on CRM 204.

Imaging controller 208 manages multi-spectral array imager 212 and the image capturing performed thereby. For example, imaging controller 208 can employ multi-spectral array imager 212 to capture a set of images of a scene based on a user selection to perform the capture. Based on user input, the imaging controller 208 can adjust which portions of a scene are captured by multi-spectral array imager 212. A user input may be received, for instance, for zooming in to capture a portion of the scene. Accordingly, the imaging controller 208 can cause the multi-spectral array imager 212 to zoom in so that when the images of the scene are captured they are zoomed in from a previous level of zoom. In a similar manner, the imaging controller 208 can cause the multi-spectral array imager 212 to zoom out so that when images of a scene are captured they are zoomed out from a previous level of zoom.

In addition or alternately, imaging controller 208 can be employed to configure the individual imagers of the multi-spectral array imager 212. For example, the imaging controller 208 may be employed to change a type of radiation to which an individual imager is sensitive. The imaging controller 208 may adjust an individual imager in the multi-spectral array imager 212 from being sensitive to visible light so that it is sensitive instead to ultraviolet light, infrared, or some other type of radiation. Likewise, imaging controller 208 may adjust an individual imager in the multi-spectral array imager 212 from being sensitive to ultraviolet light, infrared, or some other type of radiation so that it is instead sensitive to visible light.

In other words, imaging controller 208 may configure individual imagers in the multi-spectral array imager 212 from being sensitive to one type of radiation to being sensitive to a different type of radiation. To do so, imaging controller 208 may cause a filter for an individual imager to be changed so that the individual imager is thereafter sensitive to the different type of radiation. Imaging controller 208 may configure the individual imagers of the multi-spectral array imager 212 based on user input to do so. Imaging controller 208 may also configure the individual imagers of the multi-spectral array imager 212 automatically, such as based on a determination that the set of images is being captured in the dark (e.g., at night), that the scene includes an object for which a particular type of radiation may provide interesting information about the object, and so on.

In some implementations, however, the imagers of the multi-spectral array imager 212 may not be configurable such that a type of radiation to which an imager is sensitive can be changed at any given time. Instead, the imagers of the multi-spectral array imager 212 may be statically configured such that each individual imager is sensitive to just one particular type of radiation for a life of the imager. In such implementations the imaging controller 208 does not configure the individual imagers of the multi-spectral array imager 212 from being sensitive to one type of radiation to being sensitive to another type of radiation. It is also within the scope of the techniques described herein that the multi-spectral array imager 212 include a combination of both imagers that can be configured to change the type of radiation to which they are sensitive and imagers that cannot be configured to change the type of radiation to which they are sensitive.

The imaging controller 208 can also manage the imagery or content presented on display 104. For example, imaging controller 208 can cause display 104 to present multiple views of a scene, such as views 116, 118, 120, 122, 124, 126, 128, 130, 132 described in more detail with reference to FIG. 1. Imaging controller 208 can cause images that have already been captured of the scene to be presented via views 116, 118, 120, 122, 124, 126, 128, 130, 132. Additionally, imaging controller 208 can cause views 116, 118, 120, 122, 124, 126, 128, 130, 132 to present the scene in real-time. As discussed above, the human eye may not be capable of perceiving radiation to which some imagers of the multi-spectral array imager 212 are sensitive. For views corresponding to those imagers, the imaging controller 208 can cause visible-light interpretations of the radiation sensed by the imagers to be generated. The visible-light interpretations of the sensed radiation can then be displayed though a corresponding view.

Compression engine 210 can encode images according to multi-spectral image compression techniques so that the information that results from the encoding is smaller, in terms of storage size, than the uncompressed images. The compression engine 210 can encode images and video captured by a multi-spectral array imager using a combination of spatial prediction, temporal prediction, and spectral prediction. Given a single image, for instance, compression engine 210 can use spatial prediction to encode the image. Spatial prediction involves predicting the color of a small region in a single image from the color values of nearby regions in the image. When encoded, the small region is represented by a delta between the predicted color value and the small region's actual color.

For video content having multiple frames ordered in a temporal sequence, compression engine 210 can use temporal prediction to encode a given frame of the video content. Temporal prediction involves predicting regions in a frame using corresponding regions in previous and subsequent frames of the video content. In a temporal-based encoding, the region in a frame can be represented by a delta between the value predicted using the previous and subsequent frames and the region's actual value. Video content may include multiple videos each of which is captured by a different imager of the multi-spectral array imager. Each video may include multiple frames, each of which can be treated by the compression engine 210 as a separate image.

For one of these videos, the compression engine 210 can use temporal prediction to predict information representative of a frame given another frame of the video that corresponds to a different point in time (e.g., a frame that is previous or subsequent to the given frame).

Further, compression engine 210 can use spectral prediction techniques to encode an image in a set of images captured by a multi-spectral array imager. Spectral prediction involves predicting information representative of one image using information representative of another image and a model representing the difference in spectral sensitivities between the image and the other images. The one image and the other image both comprise images in a set that are captured by imagers of an array, at substantially a same time, but with different spectral sensitivities, e.g., because the corresponding imagers filter for different types of radiation. The different filters or different spectral sensitivities with which a set of images is captured results in images of differing resolutions. An infrared image has a lower resolution (because infrared has a longer wavelength of light or due to a smaller amount of light in those wavelengths) than a visible-light image, for example. Such differences can then be used to order the images in a set from highest to lowest resolution. The compression engine 210 can predict information for the one image based on the other image by accounting for the different spectral sensitivities with which the images are captured. The compression engine 210 can then use delta encoding to encode the set of images, given the prediction and a delta between the prediction and the actual image information.

Broadly speaking, delta encoding is a way of storing or transmitting data in the form of differences between different items of data rather than the different items of data in whole. Delta encoding techniques produce a technical description of the difference between two items of data—a source data item and a target data item. Given the source data item and the target data item, delta encoding techniques produce difference data that enable the target data item to be reconstructed from the source data item and the difference data item.

In addition, compression engine 210 can encode a set of images or videos captured by multi-spectral array imager 212 using combinations of spatial prediction, temporal prediction, and spectral prediction. The compression engine 210 can encode such images using spatio-temporal prediction, spatio-spectral prediction, spatio-temporal-spectral prediction, and so on.

Compression engine 210 can also select which type of encoding to use to encode unencoded images. To do so, the compression engine 210 can determine an amount that different encodings compress images captured with a multi-spectral array imager. For example, the compression engine 210 can determine amounts that information encoded using spatial prediction, information encoded using spectral prediction, and information encoded using temporal prediction compress the images captured by multi-spectral array imager 212. The compression engine 210 can then select the encoding that compresses the images a greatest amount. Continuing with the preceding example, the compression engine 210 can select, for encoding unencoded images, whichever of the spatial prediction, temporal prediction, or spectral prediction is determined to compress the images a greatest amount.

Returning to the discussion of display 104, display 104 can present views of images captured using multi-spectral array imager 212 or real-time views of a scene. In some cases, the user can interact with content-related applications or graphical user-interfaces of computing device 102 through display 104. In such cases, the display may be associated with, or include, a touch-sensitive input device (e.g., touch-screen) through which user input is received. Display 104 can be configured as any suitable type of display, such as an organic light-emitting diode (OLED) display, active matrix OLED display, liquid crystal display (LCD), in-plane shifting LCD, and so on.

Multi-spectral array imager 212, included in computing device 102, is configured to sense or capture imagery or scenery surrounding computing device 102. As described with reference to FIG. 1, each imager of multi-spectral array imager 212 may be configured with different spectral sensitivities. By way of example and not limitation, in an array of just three imagers one of the imagers may be sensitive to visible light, a second to ultraviolet light, and the third to infrared. Other configurations of an array imager having three different imagers are considered within the scope of the techniques described herein. The imagers of the multi-spectral array imager 212 may be sensitive to visible light, ultraviolet light, infrared light, x-ray, low-lux light, or any other form of radiation for which an imager can be configured to sense.

Figure 3:
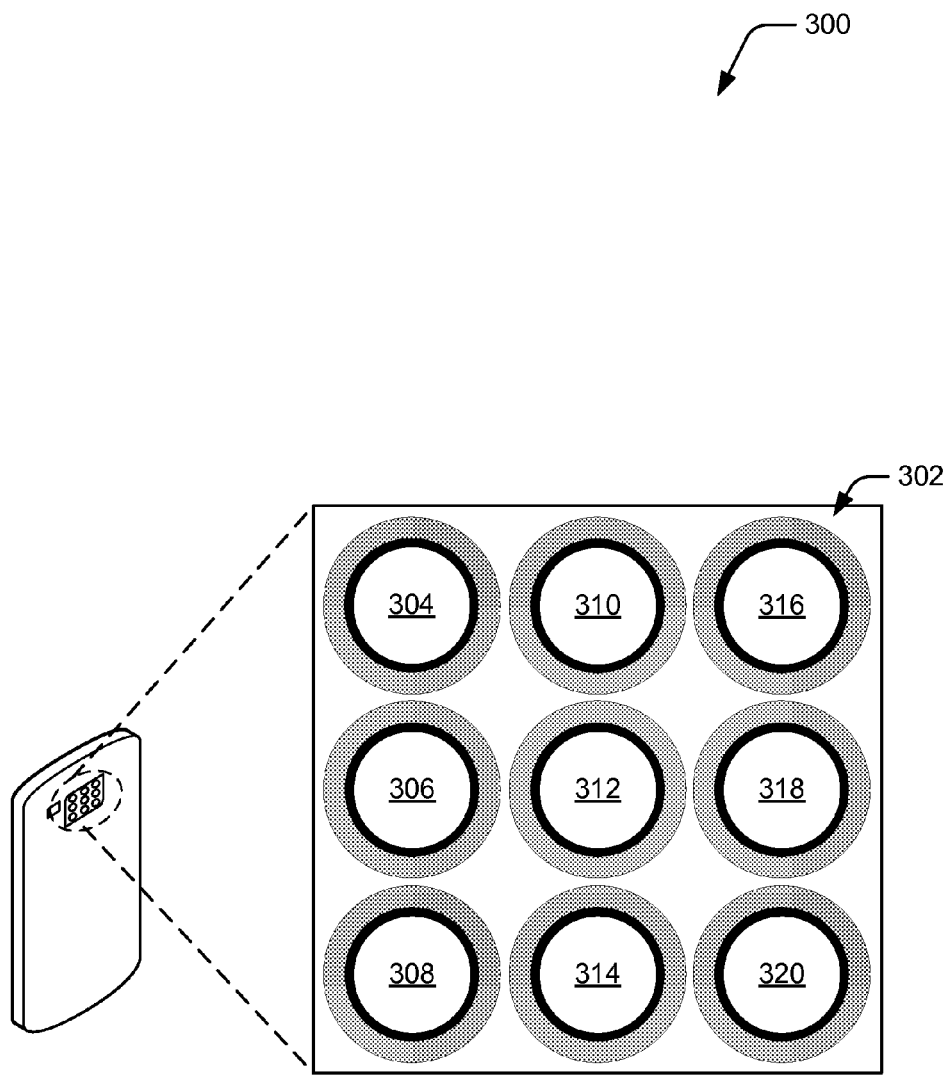
FIG. 3 illustrates portions of the computing device depicted in FIG. 2, but in greater detail.

More specifically, consider FIG. 3, which illustrates portions of the computing device depicted in FIGS. 1 and 2, but in greater detail. In particular, FIG. 3 illustrates at 300 an expanded view of a multi-spectral array imager, such as multi-spectral array imager 212. Multi-spectral array imager 302 includes imagers 304, 306, 308, 310, 312, 314, 316, 318, 320. Each of imagers 304, 306, 308, 310, 312, 314, 316, 318, 320 may capture images at different spectral sensitivities. To capture images at different spectral sensitivities, different spectral filters may be used for each of imagers 304, 306, 308, 310, 312, 314, 316, 318, 320. Alternately, at least one of imagers 304, 306, 308, 310, 312, 314, 316, 318, 320 may capture images at a same spectral sensitivity as one or more other imagers.

As described above, imagers 304, 306, 308, 310, 312, 314, 316, 318, 320 may be configurable to be sensitive to different types of radiation at different times. Imager 304, for instance, may be capable of capturing a visible-light image and then be reconfigured by imaging controller 208 to capture an ultraviolet image. Alternately, imagers 304, 306, 308, 310, 312, 314, 316, 318, 320 may not each be reconfigurable by imaging controller 208 to capture images at different spectral sensitivities. Rather, imagers 304, 306, 308, 310, 312, 314, 316, 318, 320 may each only be capable of capturing images at a single spectral sensitivity for a life of the imager. In implementations, some of imagers 304, 306, 308, 310, 312, 314, 316, 318, 320 may be capable of being reconfigured by imaging controller 208 to capture images at different spectral sensitivities while some of those imagers may only be capable of capturing images at a single sensitivity for the life of the imager.

With reference to environment 100 of FIG. 1, each of the imagers 304, 306, 308, 310, 312, 314, 316, 318, 320 may correspond to a different one of views 116, 118, 120, 122, 124, 126, 128, 130, 132 of scene 106, such that imager 308 corresponds to view 116, imager 314 corresponds to view 118, imager 320 corresponds to view 120, imager 306 corresponds to view 122, imager 312 corresponds to view 124, imager 318 corresponds to view 126, imager 304 corresponds to view 128, imager 310 corresponds to view 130, and imager 316 corresponds to view 132. In this example, imagers 308, 314, 320 can capture visible-light images, imagers 306, 312, 318 can capture ultraviolet images, and imagers 304, 310, 316 can capture infrared images. Multi-spectral array imager 302 may be configured in a variety of ways other than the configuration described in reference to FIG. 3 (e.g., other than a 3×3 grid and configured to capture images at a combination of spectral sensitivities other than described above) within the spirit of the techniques described herein.

Returning to the discussion of FIG. 2, computing device 102 may also include decoder 214, which is configured to decode images that are encoded using one or a combination of spatial prediction, temporal prediction, or spectral prediction. Compression engine 210 can determine a type of encoding used to encode image information. Given the type of encoding, the decoder 214 can be employed to decode an encoded image or a set of encoded images. Compression engine 210 may determine that a set of encoded images is encoded using spectral prediction and communicate an indication of this determined encoding to decoder 214. Decoder 214 may then decode the encoded set of images based on the determination that the set of images was encoded using spectral prediction. In a similar manner, decoder 214 may decode encoded image data that is encoded using spatial or temporal prediction.

In addition, computing device 102 includes data interfaces (not shown) for communicating data via a network or other connection. In some cases, these data interfaces are wireless transceivers for communicating via a wireless network (not shown) or directly with other devices, such as by near-field communication. Examples of these wireless networks include a wireless wide-area networks (WWAN), wireless local-area network (WLAN), and wireless personal-area network (WPAN), each of which may be configured, in part or entirely, as infrastructure, ad-hoc, or mesh networks. For example, an interface configured as a short-range wireless transceiver may communicate over a WPAN in accordance with a Bluetooth™ protocol.

Alternately or additionally, data interfaces include wired data interfaces for communicating with other devices, such as local area network (LAN) Ethernet transceiver, serial data interface, audio/video port (e.g., high-definition multimedia interface (HDMI) port), or universal serial bus (USB) port. These wired data interfaces may be implemented using standard connectors or through the use of proprietary connectors and associated cables providing enhanced security or interconnect density.

Through these data interfaces, computing device 102 can obtain a set of images captured by a multi-spectral array imager. The obtained set of images may not be encoded according to one of the described techniques or may have been encoded by such techniques. When unencoded images captured by a multi-spectral array imager are received through the data interfaces, compression engine 210 can be employed to cause these images to be encoded. On the other hand, if encoded images captured by a multi-spectral array imager are received through the data interfaces, compression engine 210 can determine what type of encoding was used to encode the images. The compression engine 210 can communicate an indication of the determined encoding to decoder 214, which can decode the images given the encoding type.

In any case, a computing device that does not include a multi-spectral array imager can be capable of encoding images captured by a multi-spectral array imager or of decoding encoded images captured by a multi-spectral array imager. By way of example, a set of images may be captured by a multi-spectral array imager at a mobile device. Rather than performing the encoding at the mobile device, the mobile device may communicate the set of unencoded images to a different computing device, e.g., to a desktop, a server, and so on. The computing device to which the set of unencoded images is communicated may then perform the encoding using the multi-spectral compression techniques described herein. Alternately, a compression engine at the mobile device may cause the set of images captured by the multi-spectral array imager of the mobile device to be encoded at the mobile device. The encoded images may then be sent to the different computing device that is capable of employing a decoder to decode the images encoded at the mobile device.

Computing device 102 may also include sensors (not shown), which enable computing device 102 to sense various properties, variances, or characteristics of an environment in which computing device 102 operates. Sensors may include any suitable type of sensor, such as an infrared sensor, proximity sensor, light sensor, acoustic sensor, magnetic sensor, temperature/thermal sensor, micro-electromechanical systems, camera sensor (e.g., charge-coupled device sensor or complementary-metal-oxide semiconductor sensor), capacitive sensor, and so on. In some cases, sensors enable interaction with, or receive input from, a user of computing device 102. In such a case, sensors may include piezoelectric sensors, capacitive touch sensors, input sensing-logic associated with hardware switches (e.g., keyboards, snap-domes, or dial-pads), and so on.

Example Techniques

The following discussion describes techniques enabling multi-spectral image compression. These techniques enable a computing device to capture a set of images at different spectral sensitivities using a multi-spectral array imager. Once the set of images are captured by the multi-spectral array imager, the set may be encoded using encoding techniques that involve spectral prediction in addition to spatial and temporal prediction. These techniques can be implemented utilizing the previously described environment, such as imaging controller 208, compression engine 210, multi-spectral array imager 212, and decoder 214 of FIG. 2. These techniques include example methods illustrated in FIGS. 4 and 5, which are shown as operations performed by one or more entities. The orders in which operations of these methods are shown or described are not intended to be construed as a limitation, and any number or combination of the described method operations can be combined in any order to implement a method, or an alternate method, including any of those illustrated by FIGS. 4 and 5.

Figure 4:
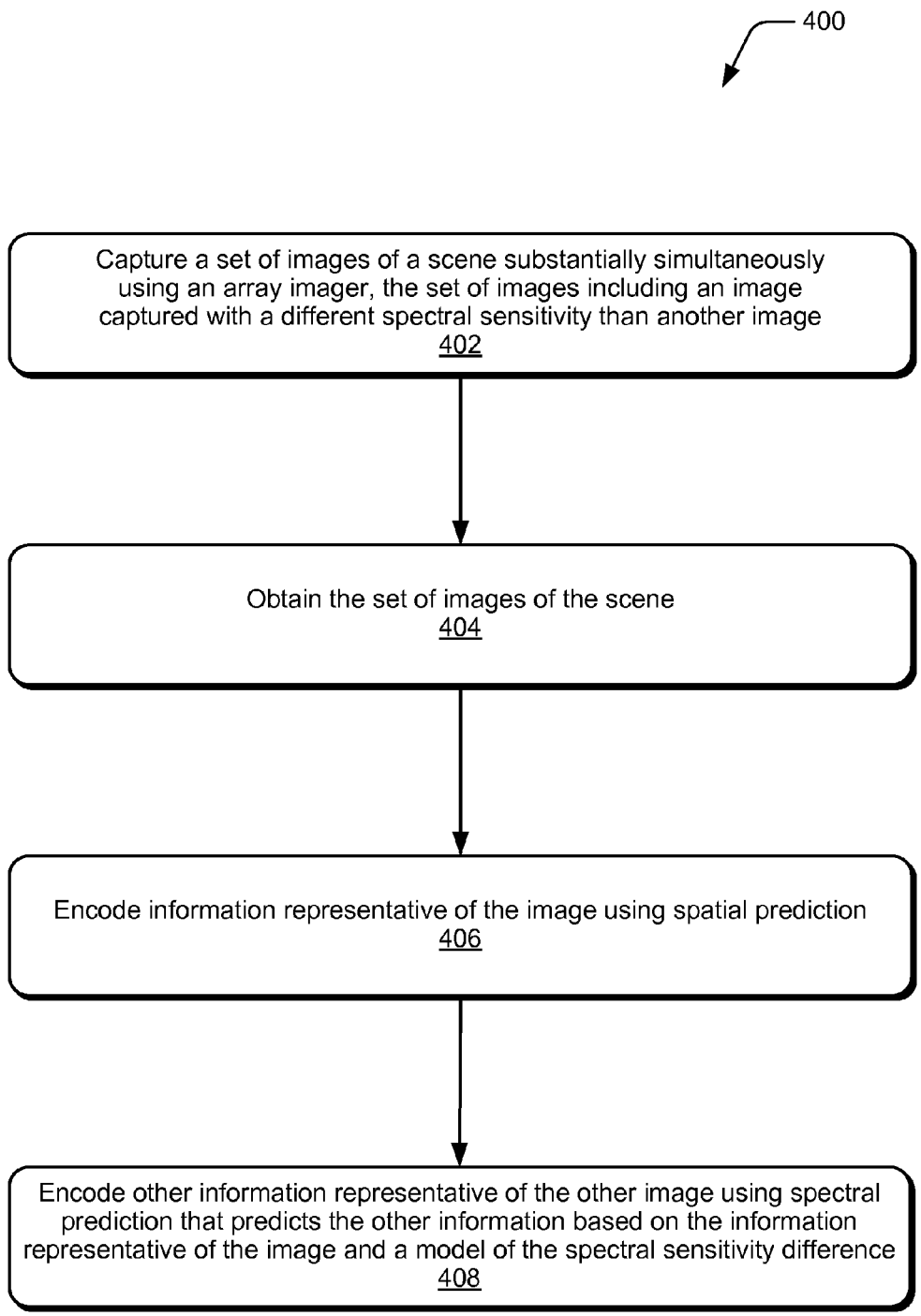
FIG. 4 illustrates an example method of compressing a set of images captured by an array imager with different spectral sensitivities in accordance with one or more implementations.

FIG. 4 illustrates an example method 400 of compressing a set of images captured by an array imager with different spectral sensitivities in accordance with one or more implementations.

At 402, a set of images of a scene is captured using an array imager. The images of the set are captured at substantially a same time and include an image captured with a different spectral sensitivity than another image. By way of example, imaging controller 208 employs multi-spectral array imager 212 to capture a set of images or video. In this example, at least two of the imagers of multi-spectral array imager 212 capture images with different spectral sensitivities, such as by using different spectral filters. The imagers of multi-spectral array imager 212 may be sensitive to at least two of visible light, ultraviolet light, infrared radiation, and x-ray, for example.

At 404, the set of images is obtained. By way of example, compression engine 210 obtains the set of images from the multi-spectral array imager 212. Alternately, the set of images are communicated from a different computing device to the computing device that includes compression engine 210. In this case, the set of images may be stored in device data 206 and obtained by compression engine 210 from device data.

At 406, information representative of the image is encoded using spatial prediction. By way of example, the compression engine 210 encodes at least one image in the set of images captured by the multi-spectral array imager 212 using spatial prediction. If video content is to be encoded, the compression engine 210 uses spatial prediction to encode at least one frame of the set of videos captured by the multi-spectral array imager 212.

At 408, other information representative of the other image is encoded using spectral prediction. The spectral prediction predicts this other information based on the information representative of the image and a model representing the difference in spectral sensitivities between the image and the other image. By way of example, compression engine 210 predicts the information of another image in the set of images using the information representative of the image encoded in act 406. To predict the information representative of the other image, compression engine 210 also uses a model representing the difference in spectral sensitivities between the image encoded in act 406 and the other image.

Figure 5:
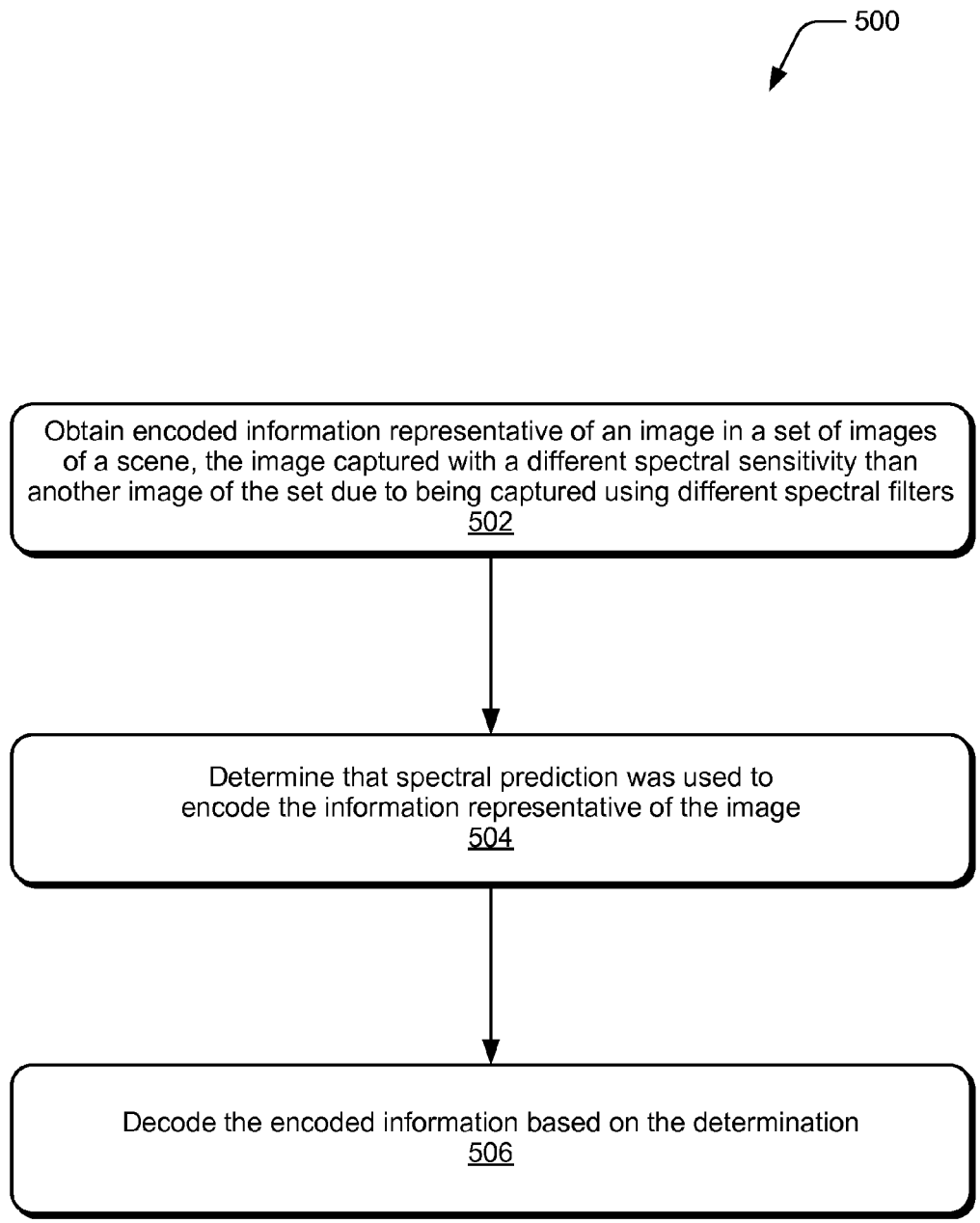
FIG. 5 illustrates an example method of decoding a set of images that is encoded using at least one of spectral prediction, spatial prediction, or temporal prediction in accordance with one or more implementations.

FIG. 5 illustrates an example method 500 of decoding a set of images that is encoded using at least one of spectral prediction, spatial prediction, or temporal prediction in accordance with one or more implementations.

At 502, encoded information is obtained that is representative of an image in a set of images of a scene. The image for which the encoded information is obtained is captured with a different spectral sensitivity than another image of the set, e.g., due to being captured using a different spectral filter than the other image. By way of example, computing device 102 obtains an encoded image or video from a set of images or videos of scene 106, such as from device data 206 or from another computing device over data interfaces of the computing device 102. The encoded image or video that is obtained from the device data 206 or other computing device is captured with a different spectral sensitivity than another image in the set of images or videos of the scene. For example, the encoded image or video that is obtained is an encoding of an image or video captured using an imager sensitive to visible light whereas another image or video in the set is captured using an imager sensitive to ultraviolet light.

At 504, a determination is made that spectral prediction was used to encode the information representative of the image. By way of example, compression engine 210 determines that the encoded image or video obtained in act 502 was encoded using spectral prediction. To do so, the compression engine 210 may check flags that are associated with the encoded image data and indicative of a type of encoding used to encode the image. The compression engine 210 may also extract this information from metadata included with the encoded image data. In addition or alternately, compression engine 210 may determine that spectral prediction was used to encode the information representative of the image from the encoded information itself.

At 506, the encoded information is decoded based on the determination. By way of example, decoder 214 decodes the encoded information representative of the image. The compression engine 210 can communicate which type of encoding was used to encode the encoded image to the decoder 214. Given the determined technique with which the image was encoded, decoder 214 can decode the information by reversing the encoding process. For example, compression engine 210 can indicate to the decoder 214 that spectral prediction was used to encode the encoded information obtained in act 502. The decoder 214 can then decode the encoded information obtained in act 502 using a technique for decoding information encoded using spectral encoding. In a similar manner, decoder 214 can decode information that was encoded using spatial prediction, temporal prediction, or some combination of spatial prediction, temporal prediction, and spectral prediction. Once decoded, the image can be configured for display, such as on display 104 of computing device 102.

Example Electronic Device

Figure 6:
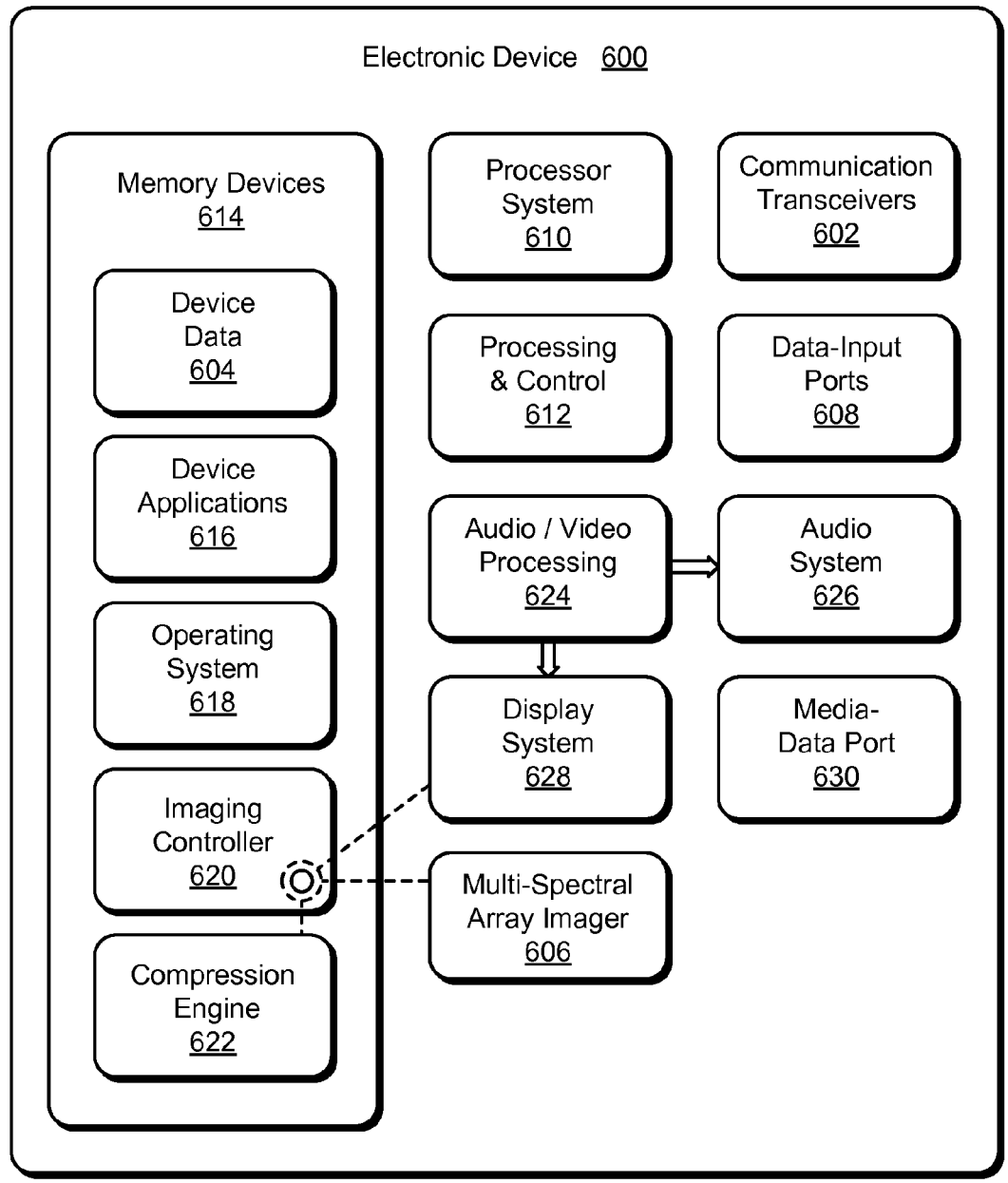
FIG. 6 illustrates various components of an electronic device that can implement multi-spectral image compression techniques.

FIG. 6 illustrates various components of an example electronic device 600 that can be implemented as a computing device as described with reference to any of the previous FIGS. 1 through 5. Electronic device 600 can be, or include, many different types of devices capable of implementing multi-spectral image compression. For example, electronic device 600 may include a camera (plenoptic), phone, personal navigation device, gaming device, Web-browsing platform, pager, media player, or any other type of electronic device, such as the computing device 102 described with reference to FIG. 1.

Electronic device 600 includes communication transceivers 602 that enable wired or wireless communication of device data 604, such as received data and transmitted data. Example communication transceivers include WPAN radios compliant with various Institute of Electrical and Electronics Engineers (IEEE) 802.15 (Bluetooth™) standards, WLAN radios compliant with any of the various IEEE 802.11 (WiFi™) standards, WWAN (3GPP-compliant) radios for cellular telephony, wireless metropolitan area network radios compliant with various IEEE 802.16 (WiMAX™) standards, and wired LAN Ethernet transceivers.

In embodiments, the electronic device 600 includes multi-spectral array imager 606, such as multi-spectral array imager 212 as described with reference to FIG. 2. The multi-spectral array imager 606 can be implemented to facilitate various embodiments of multi-spectral image compression.

Electronic device 600 may also include one or more data-input ports 608 via which any type of data, media content, and inputs can be received, such as user-selectable inputs, messages, music, television content, recorded video content, and any other type of audio, video, or image data received from any content or data source. Data-input ports 608 may include USB ports, coaxial-cable ports, and other serial or parallel connectors (including internal connectors) for flash memory, DVDs, CDs, and the like. These data-input ports may be used to couple the electronic device to components, peripherals, or accessories such as keyboards, microphones, or cameras.

Electronic device 600 of this example includes processor system 610 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively or in addition, the electronic device can be implemented with any one or combination of software, hardware, firmware, or fixed-logic circuitry that is implemented in connection with processing and control circuits, which are generally identified at 612 (processing and control 612). Although not shown, electronic device 600 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 600 also includes one or more memory devices 614 that enable data storage, examples of which include random access memory (RAM), non-volatile memory (e.g., read-only memory (ROM), flash memory, EPROM, EEPROM, etc.), and a disk storage device. Memory devices 614 are implemented at least in part as a physical device that stores information (e.g., digital or analog values) in storage media, which does not include propagating signals or waveforms). The storage media may be implemented as any suitable types of media such as electronic, magnetic, optic, mechanical, quantum, atomic, and so on. Memory devices 614 provide data storage mechanisms to store the device data 604, other types of information or data, and various device applications 616 (e.g., software applications). For example, operating system 618 can be maintained as software instructions within memory devices 614 and executed by processors 610. In some aspects, imaging controller 620 and compression engine 622 are embodied in memory devices 614 of electronic device 600 as executable instructions or code. Although represented as a software implementation, imaging controller 620 and compression engine 622 may be implemented as any form of a control application, software application, signal processing and control module, firmware that is installed on the device, a hardware implementation of the controller, and so on.

Electronic device 600 also includes audio and video processing system 624 that processes audio data and passes through the audio and video data to audio system 626 and to display system 628. Audio system 626 and display system 628 may include any modules that process, display, or otherwise render audio, video, display, or image data, such as imaging controller 620 and compression engine 622. Display data and audio signals can be communicated to an audio component and to a display component via a radio-frequency link, S-video link, HDMI, composite-video link, component-video link, digital video interface, analog-audio connection, or other similar communication link, such as media-data port 630. In some implementations, audio system 626 and display system 628 are external components to electronic device 600. Alternatively or additionally, display system 628 can be an integrated component of the example electronic device, such as part of an integrated display and touch interface.

Although embodiments of multi-spectral image compression have been described in language specific to features or methods, the subject of the appended claims is not necessarily limited to the specific features or methods described. Rather, the specific features and methods are disclosed as example implementations of multi-spectral image compression.

The invention claimed is:

1. A computer-implemented method comprising:
   obtaining a set of images of a scene that were captured substantially simultaneously by an array imager, each image in the set of images having been captured with a different spectral sensitivity by using a different spectral filter such that the set of images includes images of the same scene with differing resolutions in terms of wavelength, the set of images including a visible-light image and non-visible light images, the non-visible light image including an infrared (IR) light image and an ultraviolet (UV) light image;
   ordering the set of images according to resolution in terms of wavelength from highest to lowest;
   encoding first information representative of the visible-light image using spatial prediction; and
   encoding second information representative of the IR light image using spectral prediction, the spectral prediction predicting the second information representative of the IR light image based, in part, on the first information representative of the visible-light image and a model representing the difference in spectral sensitivities between the visible-light image and the non-visible light images.

2. The computer-implemented method as recited in claim 1 further comprising capturing the set of images of the scene substantially simultaneously using the array imager.

3. The computer-implemented method as recited in claim 1 wherein obtaining the set of images comprises receiving the set of images from another device that captured the images using the array imager.

4. The computer-implemented method as recited in claim 1 further comprising:
   obtaining multiple sets of images, each of the multiple sets captured by the array imager at different points in time, the multiple sets of images including a first set having the visible light image and the non-visible light images from a first point in time, and a second set having a secondary visible light image and secondary non-visible light images from a second point in time, the second point in time being different from the first point in time; and
   encoding information representative of the multiple sets of images using temporal prediction, the temporal prediction predicting the information representative of the second set based, in part, on information representative of the first set.

5. A device comprising:
   a multi-spectral array imager configured to capture a set of images of a scene substantially simultaneously, the multi-spectral array imager further configured to capture each image in the set of images with a different spectral sensitivity using a different spectral filter such that the set of images includes images of differing resolutions in terms of wavelength, the set of images including visible light image, and non-visible light images including an infrared (IR) image and an ultraviolet (UV) light image; and
   a compression engine embodied at least partially in hardware of the device and configured to:
   order the set of images according to resolution in terms of wavelength from highest to lowest;
   encode first information representative of the visible-light image using spatial prediction; and
   encode second information representative of the IR light image using spectral prediction, the spectral prediction predicting the second information representative of the IR light image based, in part, on the first information representative of the visible-light image and a model representing the difference in spectral sensitivities of the set of images.

6. The device as recited in claim 5 wherein the multi-spectral array imager comprises multiple imagers, each of which is configured to capture one of the images of the set.

7. The device as recited in claim 5 wherein:
the multi-spectral array imager is further configured to capture multiple sets of images, each of the multiple sets captured by the multi-spectral array imager at different points in time; and
the compression engine is further configured to cause information representative of the multiple sets of images to be encoded using temporal prediction, the temporal prediction predicting information representative of one of the sets of images based, in part, on information representative of another of the sets of the images captured at a different point in time than the one set of images.

8. The device as recited in claim 5 further comprising a decoder configured to decode information encoded using the spectral prediction, the spatial prediction, or temporal prediction.

9. The device as recited in claim 5 wherein the compression engine is further configured to:
determine whether information representative of an image is encoded using the spectral prediction, spatial prediction, or temporal prediction; and enable a decoder to decode the information based on the determination.

10. The device as recited in claim 5 wherein the compression engine is further configured to cause information representative of one or more of the images in the set to be encoded using a combination of the spectral prediction, the spatial prediction, and temporal prediction.

* * * * *